United States Patent [19]

Yocum

[11] Patent Number: 5,088,856
[45] Date of Patent: Feb. 18, 1992

US005088856A

[54] RADIANT HEAT ROTARY VOLATILIZER

[75] Inventor: Gene H. Yocum, Rockville, Md.

[73] Assignee: Soils, Inc., Clifton, Va.

[21] Appl. No.: 634,537

[22] Filed: Dec. 27, 1990

Related U.S. Application Data

[63] Continuation of Ser. No. 495,415, Mar. 19, 1990.

[51] Int. Cl.⁵ ............................................. B09B 3/00
[52] U.S. Cl. .................................... 405/128; 110/346;
 110/246; 110/255; 405/131
[58] Field of Search ............... 405/128, 129, 131, 303,
 405/258; 110/346, 255, 246, 236

[56] References Cited

U.S. PATENT DOCUMENTS

| | | | |
|---|---|---|---|
| 4,009,667 | 3/1977 | Tyer et al. | 110/255 X |
| 4,084,521 | 4/1978 | Herbold et al. | 110/346 X |
| 4,667,609 | 5/1987 | Hardison et al. | 110/236 |
| 4,730,564 | 3/1988 | Abboud | 110/246 |
| 4,781,944 | 11/1988 | Jones | 405/129 X |
| 4,870,911 | 10/1989 | Chang et al. | 110/255 X |
| 4,927,293 | 5/1990 | Campbell | 405/128 |

Primary Examiner—Dennis L. Taylor
Attorney, Agent, or Firm—Howard L. Rose

[57] ABSTRACT

An apparatus and method for remediating soils and other materials contaminated with organic compounds comprising dual volatilizing zones and radiant heat. The material is treated in the volatilizing zones to substantially volatilize the organic compounds contained within the material.

32 Claims, 3 Drawing Sheets

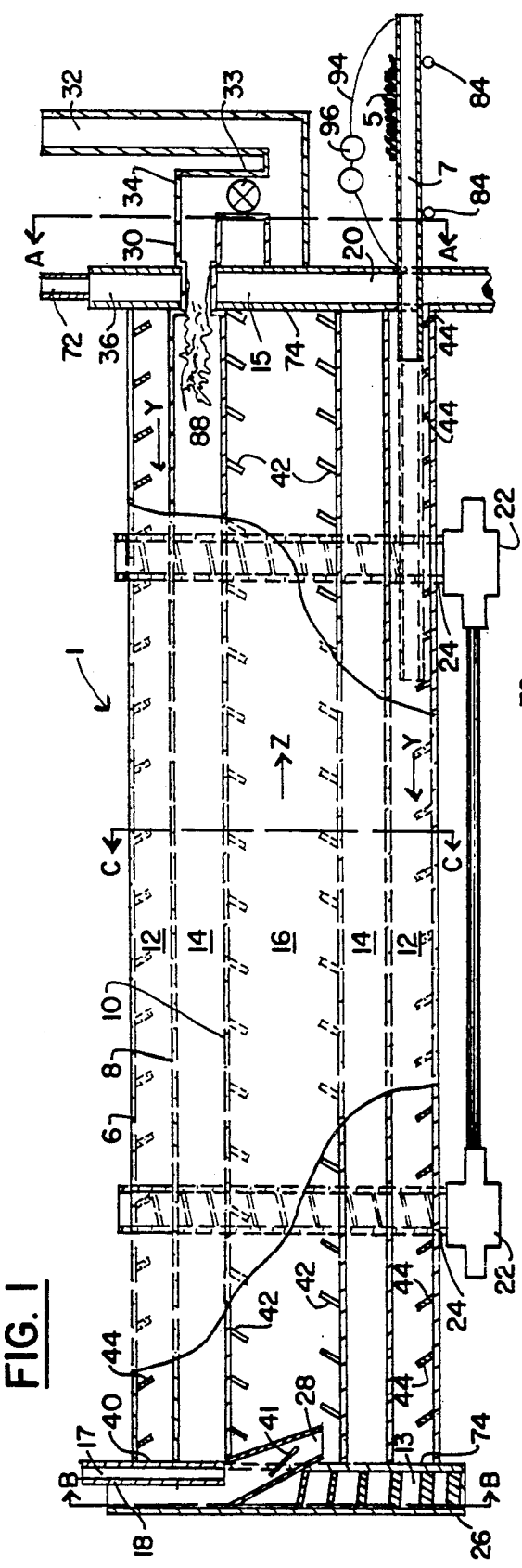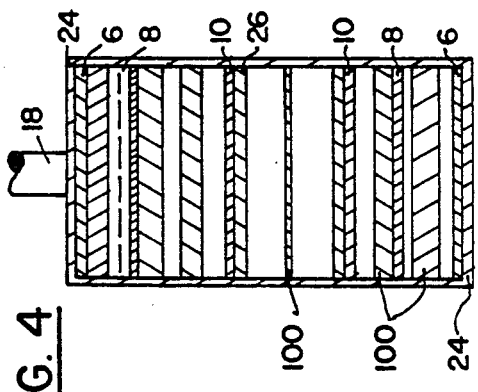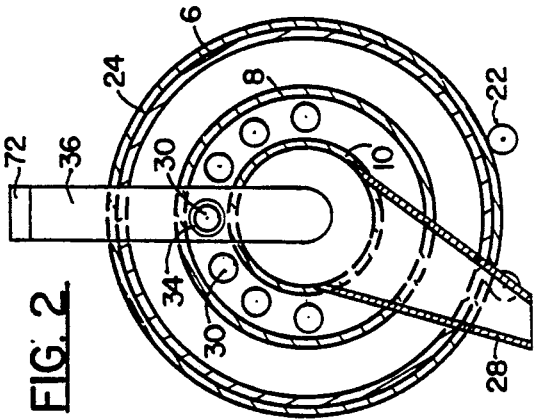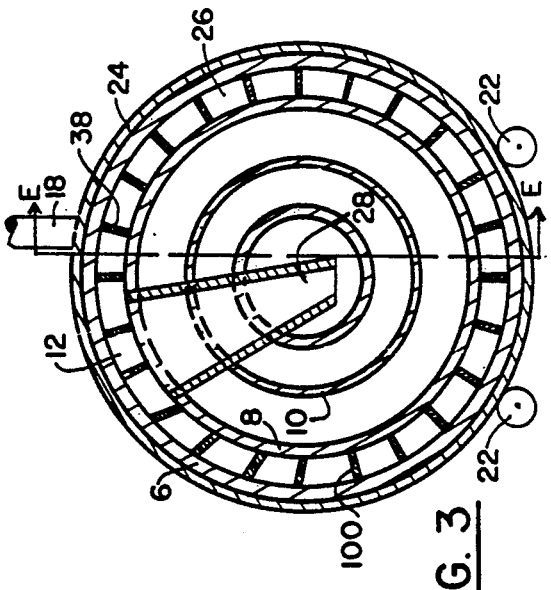
FIG. 1
FIG. 2
FIG. 3
FIG. 4

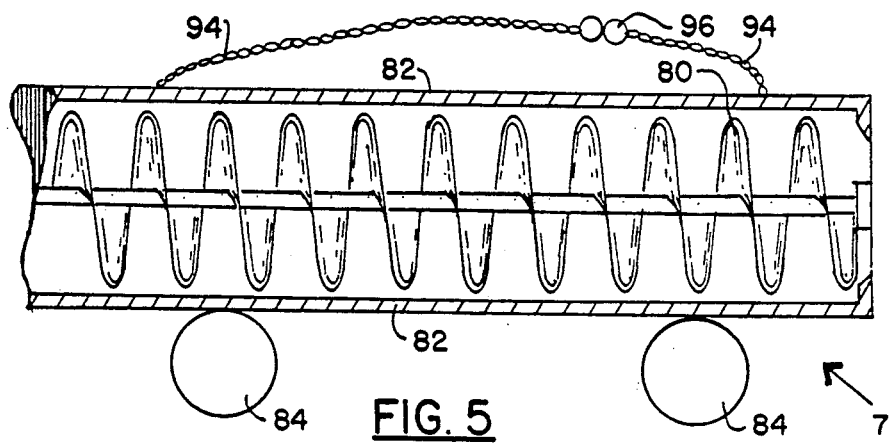
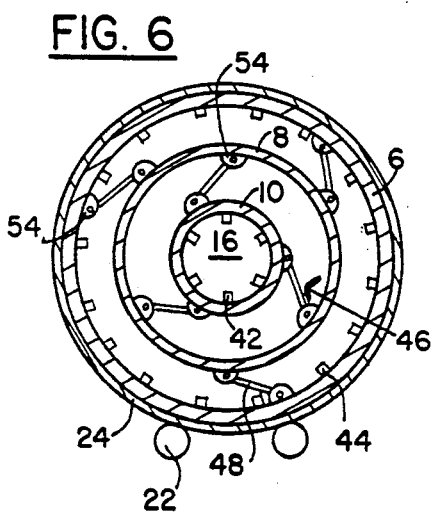
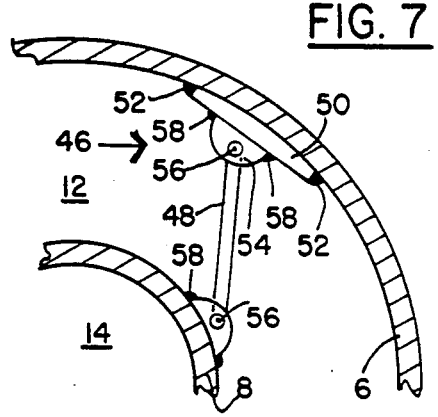
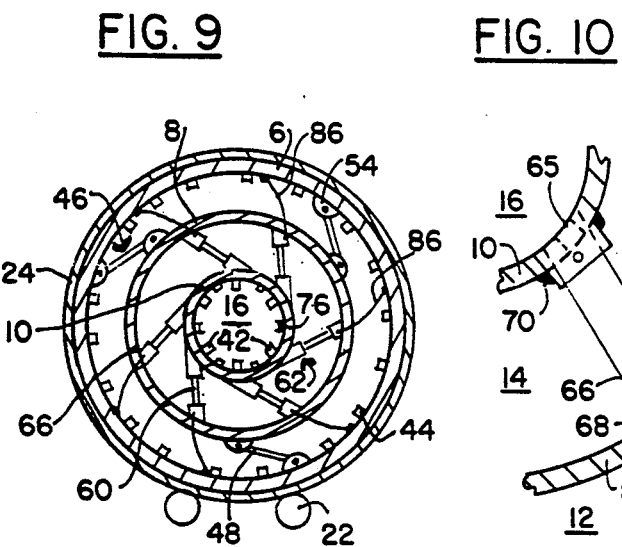
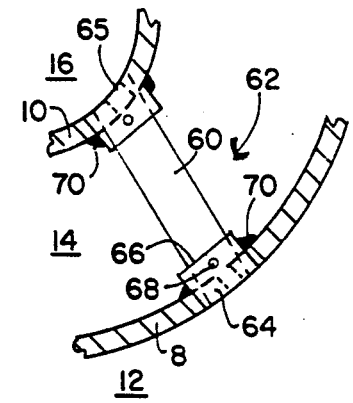

RADIANT HEAT ROTARY VOLATILIZER

This is a continuation, of application Ser. No. 07/495,415 filed Mar. 19, 1990.

BACKGROUND OF THE INVENTION

This invention relates to an apparatus and method for remediation of soils and other materials contaminated with organic and other compounds. The invention is of the type that employs dual volatilizing zones and radiant heat.

Such structures, according to this invention, generally will substantially volatilize organic and other compounds contained within the material, and substantially eliminate harmful pollutants from the exhaust fumes. In preferred embodiments, a volatilizer is comprised of three concentric, rotating cylinders, such that the material traverses several distinct drying zones and undesirable organic compounds are volatilized as the cylinders rotate.

It is known, in material heating/drying systems, to make use of a system including a rotating drum and an open flame heater, such that as the material traverses the length of the system, the material is heated/dried. In each of these cases a great expenditure of energy is required to reach the desired temperature, in order to adequately treat the material, and the fumes that are exhausted from the heating and/or drying process must be filtered to remove harmful pollutants.

Exemplary of such prior art heating/drying systems are devices as disclosed in U.S. Pat. Nos. Re. 30,685 to Mendenhall and 1,041,226 to Ames, as well as well-known devices of the single zone radiant heat/drier type. The Mendenhall patent discloses a process for recycling asphalt aggregate compositions which is comprised of a rotatable drum, a firing chamber, heating tubes and means to transport volatile gases from the mixing chamber to the firing chamber. The Ames patent, as another alternative, discloses a machine for treating bituminous or asphaltic compounds which is comprised of an open-flame heater, a material lifting means and a rotating cylindrical drum having a series of cylinders surrounding a central cone, such that the material is fed into the cylinders at one end of the machine and is discharged from the cone at that same end of the machine.

While these two systems are capable of heating/drying the material, they are made up, of necessity, of numerous parts. Due to the sheer number of these parts and their complex arrangements, all necessary to properly heat the material, the material is not efficiently heated. For this reason, a large amount of energy is needed to initially heat and then to maintain the correct temperature in the cylindrical drum, due in part to the large surface area of the heating tubes and cylinders contained within the respective drums. A system which did not require the expenditure of these amounts of energy could be highly desirable.

Single-zone radiant heater/driers are well-known. Generally speaking such devices are usually comprised of a cylindrical drum a radiant heater, and means to traverse the length of the drum in a single pass while the material is being heated/dried. While such systems are currently in use, they suffer from the problem that not all the undesirable volatile organic compounds are volatilized from the material, because the required temperature is often not reached. Conversely, in order to achieve the desired temperature, a large amount of fuel must be expended. Consequently, either the material must be treated again, or extra fuel must be used. Either way, the process becomes expensive. A system which neared the relative simplicity of this system, but overcomes its above-described problems, would be most desirable.

It is apparent from the above that there exists a need in the art for a material volatilizer which is fuel-efficient, through simplicity of parts and uniqueness of structure, and which at least equals the safety characteristics of known heater/driers, but which at the same time adequately treats the material so as to substantially volatilize the organic compounds contained in the material. It is a purpose of this invention to fulfill this and other needs in the art in a manner more apparent to the skilled artisan, once given the following disclosure.

SUMMARY OF THE INVENTION

Generally speaking, this invention fulfills these needs by providing an apparatus for remediating material which is comprised of a rotating cylindrical drum having first, second and third concentric cylinders of decreasing diameters, means to introduce said material into said drums such that said material is introduced into said first cylinder, a radiant heating means which interacts with said second cylinder to create an atmosphere which will substantially volatilize organic compounds contained in said material, transporting means for transporting said material along a length of said first and third cylinders, a transfer means to transfer said material from said first cylinder to said third cylinder, and an exhaust means to substantially ventilate said compounds away from said material as said compounds are volatilized.

In certain preferred embodiments, the three concentric cylinders are maintained in their respective positions by connector rod or connector tube suspension systems. Also, the material introduction means may be adjustable. Finally, a vent may be used between the third cylinder and the second cylinder to vent volatilized organic compounds into the radiant heating zone, in order to substantially eliminate the volatilized compounds. In many of the preferred embodiments, as contemplated by this invention, substantially all of the organic compounds contained within the material will be volatilized.

Generally speaking, the volatilizers of this invention offer the following advantages: easy assembly and repair; excellent stability, durability, economy, and safety characteristics; high fuel efficiency; excellent temperature characteristics and advantageous pollution control characteristics. In fact, in many of the preferred embodiments, these factors of fuel efficiency, temperature characteristics and pollution control are optimized to an extent considerably higher than heretofore achieved in prior, known systems.

BRIEF DESCRIPTION OF THE DRAWINGS

FIG. 1 is a side plan partially sectionalized view of a volatilizer, according to the present invention.

FIG. 2 is an end view, along lines A—A in FIG. 1, according to the present invention.

FIG. 3 is another end view, along lines B—B in FIG. 1, according to the present invention.

FIG. 4 is a side view taken along lines E—E in FIG. 3, depicting the material lifting system.

FIG. 5 is a magnified view of the adjustable conveyor.

FIG. 6 is an end view, taken along lines C—C in FIG. 1, depicting the end view of the preferred suspension system of the concentric cylinders, according to the present invention.

FIG. 7 is a magnified view of the suspension system of FIG. 1, showing one connection, according to the present invention.

FIG. 9 is a drawing, taken along line D—D in FIG. 8, depicting the end view of another preferred suspension system of the concentric cylinder, according to the present invention.

FIG. 10 is a magnified view of the suspension system of FIG. 9, showing one connection, according to the present invention.

DETAILED DESCRIPTION OF THE INVENTION

Figure 8:
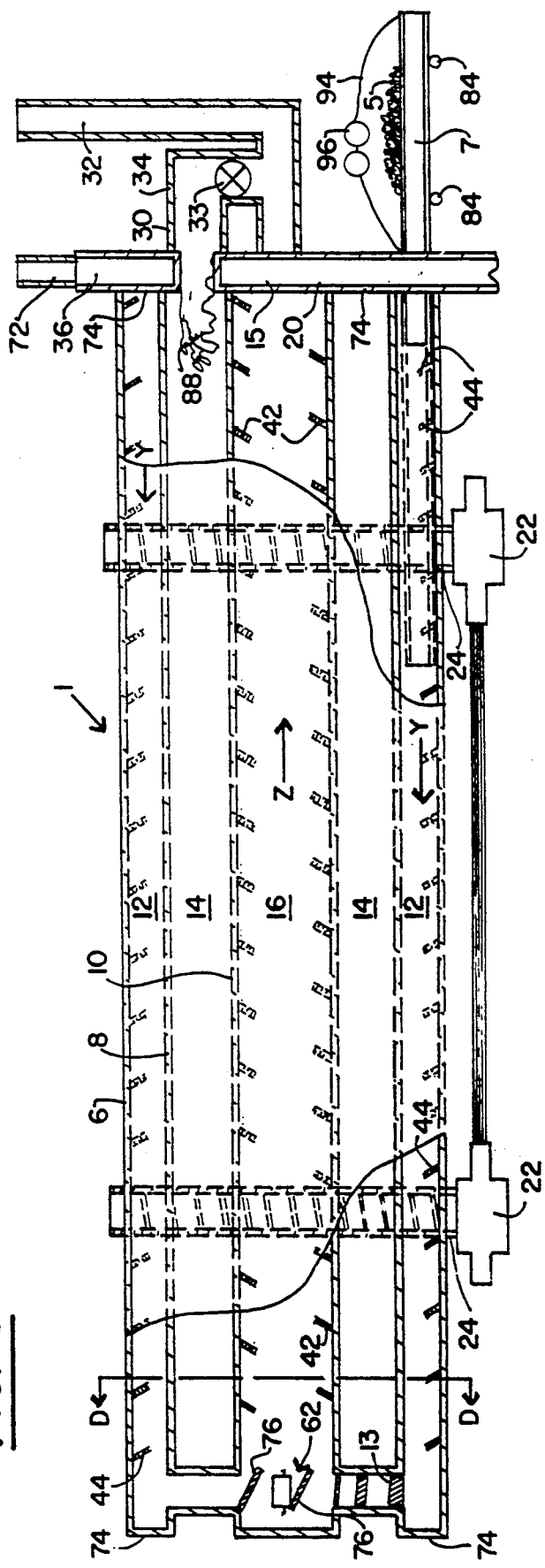
FIG. 8 is a side plan view of another preferred embodiment of a volatilizer, according to the present invention.

With reference first to FIG. 1, there is illustrated one preferred embodiment for use of the concepts of this invention. Volatilizer 1 having three concentric cylinders 6, 8 and 10 of equally decreasing diameters is rotated by conventional trunions 22 which contact tires 24. Cylinder 6 is preferably constructed of a mild steel, while cylinders 8 and 10 are constructed of a heat-resistant metal, preferably stainless steel. The preferable thickness of the material for all the cylinders should be three-eights of an inch. The preferable length of the cylinders should be thirty feet. The diameter of cylinders 6, 8 and 10 should be eight feet, five and three quarters feet, and three feet, respectively. Trunions 22 are powered by any well-known driver, such as a motor (not shown). Tires 24, which are preferably steel, contact trunions 22, and, consequently, volatilizer 1 is rotated by trunions 22, because volatilizer 1 rests on trunions 22. Tires 24 are attached to the outer periphery of cylinder 6, preferably by welding. While trunions 22 are shown, it is understood that other well-known methods of rotation can be employed.

Located within volatilizer 1 are three zones: primary volatilizing zone 12; combustion zone 14; and secondary volatilizing zone 16. Heaters 30, preferably any conventional-type, variable output burners which vary air flow and fuel rate, are positioned partially around one end of volatilizer 1 within combustion zone 14 (as shown in FIG. 2), to produce flame 88. Positioned at the other end of volatilizer 1 is exhaust vent 18, having dampers 40 and 41, which will substantially exhaust from zones 12 and 16 volatilized organic compounds that were contained within contaminated material 5. Located within volatilizer 1 are heat sensors 13, 15, and 17, preferably conventional thermocouples. Sensor 13 is located near rotary elevator 26 or connectors 62 (FIG. 3). Sensor 15 is located at discharge 20. Sensor 17 is located in vent 18.

Material 5 is introduced into primary volatilizing zone 12 by adjustable conveyor 7. Because different materials will be treated and the materials will contain various kinds of contaminants, conveyor 7 can be adjusted to change the length of time that material 5 spends in volatilizing zones 12 and 16.

As shown in FIG. 5, conveyor 7, preferably a rotary auger 80, is encased within cylindrical housing 82, constructed preferably of mild steel. Conveyor 7 contacts and rolls across rollers 81. Chain 94 is attached to conveyor 7 and chain 94 is attached to conventional worm drive motor 9. As motor 96 rotates either clockwise or counter-clockwise, the rotation of motor 96 will rotate chain 94 and cause conveyor 7 to shuttle back and forth across rollers 84 within zone 12. Thus, in this respect, volatilizer 1 can be customized to adjust to substantially any material 5 having a wide variety of contaminants.

Material 5 traverses the length of zone 12 in the direction of arrow Y by helices 44. In this zone, preferably, water and light organic compounds are volatilized. These volatilized compounds are exhausted through vents 18 and 32 and can be further treated, such as by any well-known method of condensation of the exhaust, to remove the various components of the volatilized compounds.

As shown in FIG. 3, when material 5, which is traveling in the direction of arrow Y along zone 12, reaches rotary elevator 26, elevator 26 transfers material 5 from primary volatilizing zone 12 to secondary volatilizing zone 16 through discharge chute 28.

More precisely, as shown in FIGS. 3 and 4, rotary elevator 26 is constructed of mild steel. Flights 100 are attached, preferably by welding, to the interior of elevator 26. A funnel-shaped rectangular chute 28, preferably made of mild steel, is attached, preferably by welding, to the top of cylinder 6. Elevator 26 is attached to volatilizer, such that elevator 26 substantially encloses zones 12, 14 and 16, and rotates along with cylinders 6, 8 and 10. As material 5 is traversed in direction Y, along helices 44, material 5 drops onto flights 100. As cylinders 6, 8 and 10 an elevator 26 rotate, material 5 is carried on flights 100 until material 5 nears chute 28, where material 5 falls off of flights 100 and falls into chute 28. Material 5 then goes through chute 28 and enters zone 16 where material 5 impinges upon helices 42.

After the material is discharged into zone 16, material 5 traverses secondary volatilizing zone 16, along helices 42 in the direction of arrow Z, until material 5 is discharged out of discharge chute 20. While in zone 16, substantially all remaining organic compounds contained in material 5 are volatilized. Consequently, not only does volatilizer 1 provide distinct, separate material treating zones 12 and 16, which volatilize different organic compounds contained within material 5, so that the various volatilized organic compounds can be later separated or burned off, but volatilizer 1 also provides an efficient means for volatilizing the organic compounds by employing substantially sealed volatilizing zones and a radiant heating zone that eliminates the dangers in open flame burners that are used in certain known devices.

As shown in FIG. 1, located alongside of heaters 30, are exhaust vents 32, 34 and 36. Exhaust vent 32 will substantially ventilate those volatilized organic compounds that are created in secondary volatilizing zone 16. Vent 34 is an optional vent that provides a conduit between vent 32 and burner 30 through valve 33, such that, if desired, substantially all those volatilized organic compounds produced in secondary volatilizing zone 16 will be conducted to burner 30, where the volatilized compounds will substantially be burned off. The vented volatilized compounds will also provide extra fuel to burners 30, thus reducing the amount of fuel needed to maintain the desired temperature in volatilizer 1. Because substantially all the compounds contained within the contaminated material will be volatilized in zones 12 and 16, when this mixture is conducted to burners 30, there is a substantially reduced threat of combustion from undesirable oxygen.

Vent 36 will substantially ventilate volatilized organic compounds from primary volatilizing zone 12. Optional blower 72 can be attached to the open end of vent 36, in order to assist in the ventilation process, by creating a draft in zone 12. Also, the volatilized organic compounds exhausted from zone 12 can be condensed by any well-known, conventional condenser (not shown) and later treated, to separate out the various liquid components.

Located alongside rotary elevator 26 is exhaust vent 18. Vent 18 will substantially ventilate low oxygen exhaust fumes, through portals 38 located in vent 18, from zones 12 and 16. Those low oxygen fumes can be released into the atmosphere or treated according to any one of a number of well-known treatment processes. Dampers 40 and 41 can be adjusted to regulate the flow of low oxygen fumes ventilated from zones 12 and 16, respectfully. Consequently, vents 18, 32 and 36 substantially eliminate the need to further filter the exhaust in order to remove the contaminants contained in the fumes because only water vapor and volatilized light organic compounds are directly vented to the atmosphere, and these fumes can be easily treated, such as by using a conventional condenser. The remaining organic compounds contained in material 5 are either rendered safe for emission into the atmosphere through the volatilization process, or else the remaining compounds are volatilized and vented back into burners 30 where the volatilized compounds are burned off.

As the organic compounds are volatilized in zone 16, the various fumes are exhausted in various methods. As material 5 leaves zone 12 and enters zone 16, material 5 may still contain some low oxygen fumes. These low oxygen fumes may be ventilated through damper 41 and out vent 18. As material 5 traverses zone 16 in the direction of arrow Z and approaches discharge chute 20, the fumes from the volatilized organic compounds contain substantially no oxygen. Thus, it may be desired to vent those fumes containing substantially no oxygen through vent 34 back into burners 30, so that these fumes are substantially burned off by burners 30. Because the fumes contain substantially no oxygen, there is no danger of a combustion near burners 30 as the vented fumes are fed into burners 30.

Referring to FIGS. 6 and 7, there is illustrated one preferred suspension system for maintaining cylinders 6, 8, and 10 in their desired concentric relationship. Because all connectors 46 are the same, and in order to avoid unreasonable confusion, only one connector 46 will be discussed, and the discussion will center on the interaction between connector 46 and cylinders 6 and 8.

As shown in FIG. 6, at least three connectors 46 are employed to maintain the concentric relationship between the respective cylinders. Upon closer examination, as shown in FIG. 7, each connector 46 has a plate 50 attached to cylinder 6, at weldments 52, preferably by welding. Pivot plate 54 is attached to plate 50, preferably by welding. Connector rod 48 is passed through a slot (not shown) in pivot plate 54. Pivot pin 56 is passed through a hole (not shown) in pivot plate 54 and a hole (not shown) in connector rod 48, in order to secure connector rod 48 to pivot plate 54. Due to the fact that the cylinders have different rates of thermal expansion, this suspension system will adjust to these different rates and should maintain the cylinders in the desired concentricity, because any thermal expansion will cause the cylinders to rotate the same, with respect to one another.

In a typical operation, where soil contaminated with, for example, an oil spill, is to be reclaimed, contaminated soil material 5 is dug up and placed on conveyor 7 and heated in zone 12 where water and light organic compounds, such as gasoline are volatilized from material 5 as material 5 traverses the length of zone 12 in direction Y along helices 44. Because water volatilizes at 212° F., and light organic compounds such as gasoline and number 2 fuel volatilize at 140° F. and 180°–400° F., respectively, it is desired that the temperature of zone 12 be approximately 250° F., at or near rotary elevator 26 or connectors 66 (shown in FIG. 8), so as to create an atmosphere where water and organic compounds can be volatilized in this zone. These fumes are exhausted through vents 18 and 36 where they can be further treated by conventional condensers. An optional blower 72 can be attached to vent 36 to aid in exhausting the fumes.

Once material 5 reaches the end of zone 12 near vent 18, rotary elevator 26 picks up material 5, by use of flights 100, and deposits material 5 in chute 28, so that partially cleansed material 5 can enter zone 16. Material 5 is then traversed along zone 16 in the direction of arrow Z and can be conveyed by helices 42 until the material reaches discharge chute 20. While in zone 16, substantially all the remaining organic compounds contained in material 5 are volatilized and exhausted through vent 32. Because organic compounds, such as toluene, volatilize near 600° F., it is desired that the heat in zone 16 be sufficient to subject material 5 to a temperature of approximately 1400° F. for at least one-half second, in order to volatilize substantially all the remaining organic compounds, contained in material 5, as quickly and as efficiently as possible.

Alternatively, material lifting means shown in FIGS. 8–10 may be employed, instead of rotary elevator 26, dampers 40 and 41, and vent 18. As material 5 approaches connectors 62, material 5 impinges upon flights 86 and enters hole 64 in cylinder 8, and exits through hole 65 in cylinder 10. Also, substantially all compounds that are volatilized in zone 12 are exhausted through connectors 62 into zone 16. In this alternative lifting means, zones 12 and 16 are substantially sealed by seals 74 at one end, which will increase the fuel efficiency of volatilizer 1.

In particular, FIGS. 9 and 10 depict the suspension system and transfer system as employed in the other preferred embodiment of FIG. 8. Because all connectors 62 are the same, only one connector 62 will be described, and that connector will be described as it relates to cylinders 8 and 10. Connectors 48, between cylinders 6 and 8, are identical to those described in relation to FIGS. 6 and 7.

Pivot plates 66 are attached to cylinders 8 and 10, at 70, preferably by welding. Pivot plates 66 have a slot (not shown) which is aligned with holes 64 and 65 in cylinders 8 and 10, respectively. Hollow tubes 60 are preferably rectangular, but may be cylindrical if desired. Tubes 60 are inserted into their respective slots in pivot plate 66, and are secured to pivot plate by pivot pins 68. As material 5 is traversed along zone 12 in direction arrow Y, material 5 falls off of helices 44 onto flights 86, due to gravity, and is transported through hollow tubes 60 where material 5 is deposited onto zone 16. Flights 76 are secured to cylinder 10, preferably by welding, in order to substantially prevent material 5 from re-entering connections 62.

In this respect, the concentricity of cylinders 6, 8 and 10 is maintained, because as cylinders 6, 8 and 10 thermally expand, connectors 62 will pivot about pins 68, in order to adjust to this thermal expansion. Also, material 5 is transported from zone 12 to zone 16 without the use of an expensive rotary elevator, and volatilized organic compounds from zone 12 can be vented into zone 16, where they can be later burned off.

As mentioned in the previous embodiment, the fumes from the volatilized compounds in zone 16 can be vented back into burners 30 through vent 34. There is a reduced risk of explosion because the fumes contain substantially no oxygen.

Volatilizer 1 has seals 74 acting between the end of cylinders 6, 8 and 10 and rotary elevator 26 at the other end of cylinders 6, 8 and 10 and discharge chute 20. If the suspension system, as shown in FIGS. 8-10, is employed, seal 74 need only be applied between the ends of cylinders 6, 8 and 10 and vent 18, because rotary elevator 26 has been replaced with connector 62. This alternative will reduce the cost of volatilizer 1 because expensive rotary elevator 26 will not have to be used.

While only one volatilizer drive 24 is shown, it can change the speed of the motor or the diameters of tires 24 and trunions 22, in order to vary the time it takes for material 5 to traverse zones 12 and 16. Also, helices 44 and 42 can have different orientations in order to vary the material traversing time.

By the simple, yet unique, combination of elements above, there is achieved a device that will volatilize substantially all organic compounds contained within a particular type of material. These organic compounds will be volatilized in a safe and efficient manner by utilizing radiant heat instead of the costly and inefficient open flame heater. Also, the radiant heat also eliminates the need for a costly exhaust filter, because the volatilization process should render the fumes from the volatilizer compounds harmless. Finally, various materials, containing a variety of organic compounds, can be treated with this machine.

Once given the above disclosure, many other features, modifications and improvements will become apparent to the skilled artisan. Such features, modifications and improvements are, therefore, considered to be a part of this invention, the scope of which is to be determined by the following claims.

I claim:
1. An apparatus for heating material which is comprised of:
 a rotary cylindrical drum, having first, second and third concentric cylinders of decreasing diameters;
 means to introduce said material into said drum, such that said material is introduced into one of said first and third cylinders;
 a heating means interacting with said second cylinder to create an atmosphere in said first and third cylinders which will heat said materials required;
 transporting means for transporting said material along a length of said first and third cylinders;
 a transfer means to transfer said material from said one to the other of said first and said third cylinders; and
 an exhaust means to substantially ventilate gases evolved from said material away from said material as said gases are evolved.

2. An apparatus according to claim 1, further comprising a suspension means which maintains said cylinders in a specified concentricity.

3. An apparatus according to claim 2, wherein said suspension means is comprised of connector rods and pivot plates.

4. An apparatus according to claim 1 or claim 2, wherein said material is soil which is to be remediated in said apparatus.

5. An apparatus according to claim 1 or claim 2, wherein said one cylinder is said first cylinder and said atmosphere reaches up to 250° F. in said first cylinder and reaches up to 1,400° F. in said third cylinder.

6. An apparatus according to claim 1 or claim 2, wherein said transporting means are helices located interiorly of said first and third cylinders.

7. An apparatus according to claim 1 or claim 2, wherein said transfer means is comprised of a rotary elevator.

8. An apparatus according to claim 1 or claim 2, wherein said transfer means is located substantially within said first, second and third cylinders.

9. An apparatus according to claim 1 or claim 2, wherein said exhaust means comprises a vent means to substantially vent gases driven off from said material back to said heating means in order to substantially burn off compounds in said gases.

10. An apparatus according to claim 1 or claim 2, wherein said material introduction means is adjustable.

11. A method of heating material comprises the steps of:
 rotating a cylindrical drum having first, second and third concentric cylinders of decreasing diameters;
 conveying said material into one of said first and third cylinders;
 radiantly heating said one of said first and third cylinders;
 radiantly heating said other of said first and third cylinders to further heat said material;
 traversing said material along the length of said other of said cylinders; and
 discharging said material.

12. A method according to claim 11, further comprising the step of exhausting gases evolved from said material from said one of said cylinders.

13. An apparatus according to claim 11 or claim 12, wherein said conveying of said material is through a flange means and idler wheels attached to said flange means.

14. A method according to claim 11 or claim 12, wherein the material to be treated is soil so as to volatize water and organic compounds and wherein said one of said cylinders is the first cylinder and further comprising the steps of exhausting said volatilized organic compounds from said third cylinder.

15. A method according to claim 11 further comprising the steps of venting said volatilized organic compounds into said second cylinder in order to burn off said organic compounds.

16. A method according to claims 11 or 12, further comprising the step of adjusting the time of said conveying of said material to alter the time said material is traversing the length of said first cylinder and subject to the heat thereof.

17. An apparatus for remediating material which is comprised of:
- a rotary cylindrical drum, having first, second and third concentric cylinders of decreasing diameters;
- means to introduce said material into said drum, such that said material is introduced into said first cylinder;
- a radiant heating means interacting with said second cylinder to create an atmosphere in said first and third cylinders which will substantially volatilize compounds contained in said material;
- transporting means for transporting said material along a length of said first and third cylinders;
- a transfer means to transfer said material from said first cylinder to said third cylinder; and
- an exhaust means to substantially ventilate said compounds away from said material as said compounds are volatilized.

18. An apparatus, according to claim 17, further comprising a suspension means which maintains said cylinders in a specified concentricity.

19. An apparatus, according to claim 18, wherein said suspension means is comprised of connector rods and pivot plates.

20. An apparatus according to claim 17 or 18, wherein said material is soil.

21. An apparatus according to claim 17 or 18, wherein said atmosphere reaches up to 250° F. in said first cylinder and reaches up to 1400° F. in said third cylinder.

22. An apparatus according to claim 17 or 18, wherein said transporting means are helices located on said first and third cylinders.

23. An apparatus according to claim 17 or 18, wherein said transfer means is comprised of a rotary elevator.

24. An apparatus according to claim 17 or 18, wherein said transfer means is located substantially within said first, second and third cylinders.

25. An apparatus according to claim 17 or 18, wherein said exhaust means comprises a vent means to substantially vent said compounds back to said heating means in order to substantially burn off said compounds.

26. An apparatus according to claim 17 or 18, wherein said material introduction means is adjustable.

27. A method of remediating material in order to substantially volatilize compounds contained within said material comprised in the steps of:
- rotating a cylindrical drum having first, second and third concentric cylinders of decreasing diameters;
- conveying said material into said first cylinder;
- radiantly heating said first cylinder to create an atmosphere that will substantially volatilize water and some of the organic compounds contained within said material;
- traversing said material along the length of said first cylinder;
- transporting said material to said third cylinder;
- radiantly heating said third cylinder to create an atmosphere that will volatilize substantially all the organic compounds contained in said material;
- traversing said material along the length of said third cylinder; and
- discharging said material.

28. A method according to claim 27, further comprising the step of exhausting said volatilized water and organic compounds from said first cylinder.

29. An apparatus, according to claim 27 or 28, wherein said conveying of said material is through a flange means and idler wheels attached to said flange means.

30. A method according to claim 27 or 28, further comprising the steps of exhausting said volatilized organic compounds from said third cylinder.

31. A method according to claim 27 or 28, further comprising the steps of venting said volatilized organic compounds into said second cylinder in order to burn off said organic compounds.

32. A method according to claim 27 or 28, further comprising the steps of adjusting said conveying of said material to alter the time said material is traversing the length of said first cylinder.

* * * * *